United States Patent
Hesch et al.

(10) Patent No.: US 10,529,135 B2
(45) Date of Patent: Jan. 7, 2020

(54) LOW-POWER MODE FEATURE IDENTIFICATION AT A HEAD MOUNTED DISPLAY

(71) Applicant: GOOGLE LLC, Mountain View, CA (US)

(72) Inventors: Joel Hesch, Mountain View, CA (US); Ashish Shah, Mountain View, CA (US); James Fung, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/220,847

(22) Filed: Jul. 27, 2016

(65) Prior Publication Data
US 2018/0033201 A1   Feb. 1, 2018

(51) Int. Cl.
| | |
|---|---|
| G09G 5/00 | (2006.01) |
| G06T 19/00 | (2011.01) |
| G02B 27/01 | (2006.01) |
| G06T 7/60 | (2017.01) |
| G09G 5/18 | (2006.01) |

(52) U.S. Cl.
CPC ........ *G06T 19/006* (2013.01); *G02B 27/0172* (2013.01); *G06T 7/60* (2013.01); *G09G 5/18* (2013.01); *G02B 2027/014* (2013.01); *G02B 2027/0138* (2013.01); *G06T 2207/30244* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 8,593,375 | B2 * | 11/2013 | Maltz | G06F 3/013 |
| | | | | 345/8 |
| 9,323,314 | B1 * | 4/2016 | Jia | G06F 9/5094 |
| 9,536,161 | B1 * | 1/2017 | Lish | H04N 5/23245 |
| 9,961,258 | B2 * | 5/2018 | Tall | H04N 5/23219 |
| 2003/0012410 | A1 * | 1/2003 | Navab | G06K 9/209 |
| | | | | 382/103 |
| 2004/0212678 | A1 | 10/2004 | Cooper et al. | |

(Continued)

FOREIGN PATENT DOCUMENTS

| | | |
|---|---|---|
| DE | 102004061841 A1 | 7/2005 |
| DE | 102005058240 A1 | 6/2007 |

OTHER PUBLICATIONS

Batching | Android Open Source Project, <https://source.android.com/devices/sensors/batching.html>, Accessed Mar. 14, 2016, 4 pages.

(Continued)

*Primary Examiner* — Anh-Tuan V Nguyen

(57) ABSTRACT

A head mounted display (HMD) adjusts feature tracking parameters based on a power mode of the HMD. Examples of feature tracking parameters that can be adjusted include the number of features identified from captured images, the scale of features identified from captured images, the number of images employed for feature tracking, and the like. By adjusting its feature tracking parameters based on its power mode, the HMD can initiate the feature tracking process in low-power modes and thereby shorted the time for high-fidelity feature tracking when a user initiates a VR or AR experience at the HMD.

17 Claims, 4 Drawing Sheets

(56) References Cited

U.S. PATENT DOCUMENTS

| | | | | |
|---|---|---|---|---|
| 2009/0237034 | A1* | 9/2009 | Lindemann | H02J 7/0031 320/136 |
| 2010/0156907 | A1* | 6/2010 | VanderSpek | G06T 15/20 345/427 |
| 2013/0050426 | A1* | 2/2013 | Sarmast | G01S 17/89 348/46 |
| 2013/0106681 | A1* | 5/2013 | Eskilsson | G06K 9/00597 345/156 |
| 2013/0121540 | A1* | 5/2013 | Garcia | G06K 9/00288 382/118 |
| 2013/0235226 | A1 | 9/2013 | Kam et al. | |
| 2014/0010407 | A1* | 1/2014 | Sinha | G06K 9/00664 382/103 |
| 2014/0010441 | A1* | 1/2014 | Shamaie | G06K 9/00355 382/164 |
| 2014/0049636 | A1* | 2/2014 | O'Donnell | G08C 17/02 348/143 |
| 2014/0145914 | A1* | 5/2014 | Latta | G06F 1/3215 345/8 |
| 2014/0192206 | A1 | 7/2014 | Holz | |
| 2014/0225918 | A1* | 8/2014 | Mittal | G06F 3/017 345/633 |
| 2014/0376773 | A1* | 12/2014 | Holz | G06F 1/1686 382/103 |
| 2015/0061995 | A1* | 3/2015 | Gustafsson | G06F 3/013 345/156 |
| 2015/0100887 | A1* | 4/2015 | Verkasalo | G06F 3/0482 715/735 |
| 2015/0193062 | A1 | 7/2015 | Wyatt | |
| 2015/0199559 | A1* | 7/2015 | Sztuk | H04N 5/23219 348/78 |
| 2016/0025971 | A1* | 1/2016 | Crow | G02B 27/0093 345/156 |
| 2016/0100105 | A1* | 4/2016 | Saito | H04N 5/23241 348/360 |
| 2016/0148433 | A1 | 5/2016 | Petrovskaya et al. | |
| 2016/0196659 | A1* | 7/2016 | Vrcelj | G06K 9/34 382/154 |
| 2016/0216751 | A1* | 7/2016 | Kim | G06F 1/3206 |
| 2016/0259400 | A1* | 9/2016 | Wagh | H04W 52/0203 |
| 2016/0307332 | A1* | 10/2016 | Ranjan | G06K 9/2027 |
| 2016/0310820 | A1* | 10/2016 | Kline | A63B 71/0619 |
| 2016/0370605 | A1* | 12/2016 | Ain-Kedem | G02B 27/0172 |
| 2017/0045928 | A1* | 2/2017 | Ishikawa | G06F 1/163 |
| 2017/0053501 | A1* | 2/2017 | Kamiwano | G08B 5/225 |
| 2017/0162225 | A1* | 6/2017 | Jeong | G11B 20/00891 |
| 2017/0192492 | A1* | 7/2017 | Li | G06F 1/324 |
| 2017/0220094 | A1* | 8/2017 | Ozawa | G06F 1/3206 |
| 2017/0272946 | A1* | 9/2017 | Watanabe | H04L 63/0853 |
| 2019/0004316 | A1* | 1/2019 | Baek | G02B 27/01 |

OTHER PUBLICATIONS

Sensor data batching for power savings (Windows Drivers), <https://msdn.microsoft.com/en-us/library/windows/hardware/mt679177(v=vs.85).aspx>, Accessed Mar. 14, 2016, 9 pages.

Verdant, et al., "Low Power Motion Detection with Low Spatial and Temporal Resolution for CMOS Image Sensor", The Inernational Workshop on Computer Architecture for Machine Perception and Sensing, Sep. 2006, 6 pages.

Zhou, Feng et al., "Trends in Augmented Reality Tracking, Interaction and Display: A Review of Ten Years of Smar", IEEE International Symposium on Mixed and Augmented Reality 2008; Sep. 15-18, 2008; 10 pages.

International Search Report and Written Opinion dated Oct. 25, 2017 for International Application No. PCT/US2017/040206, 14 pages.

Written Opinion of the International Preliminary Examining Authority dated Mar. 19, 2018 for International Application No. PCT/US2017/040206, 9 pages.

* cited by examiner

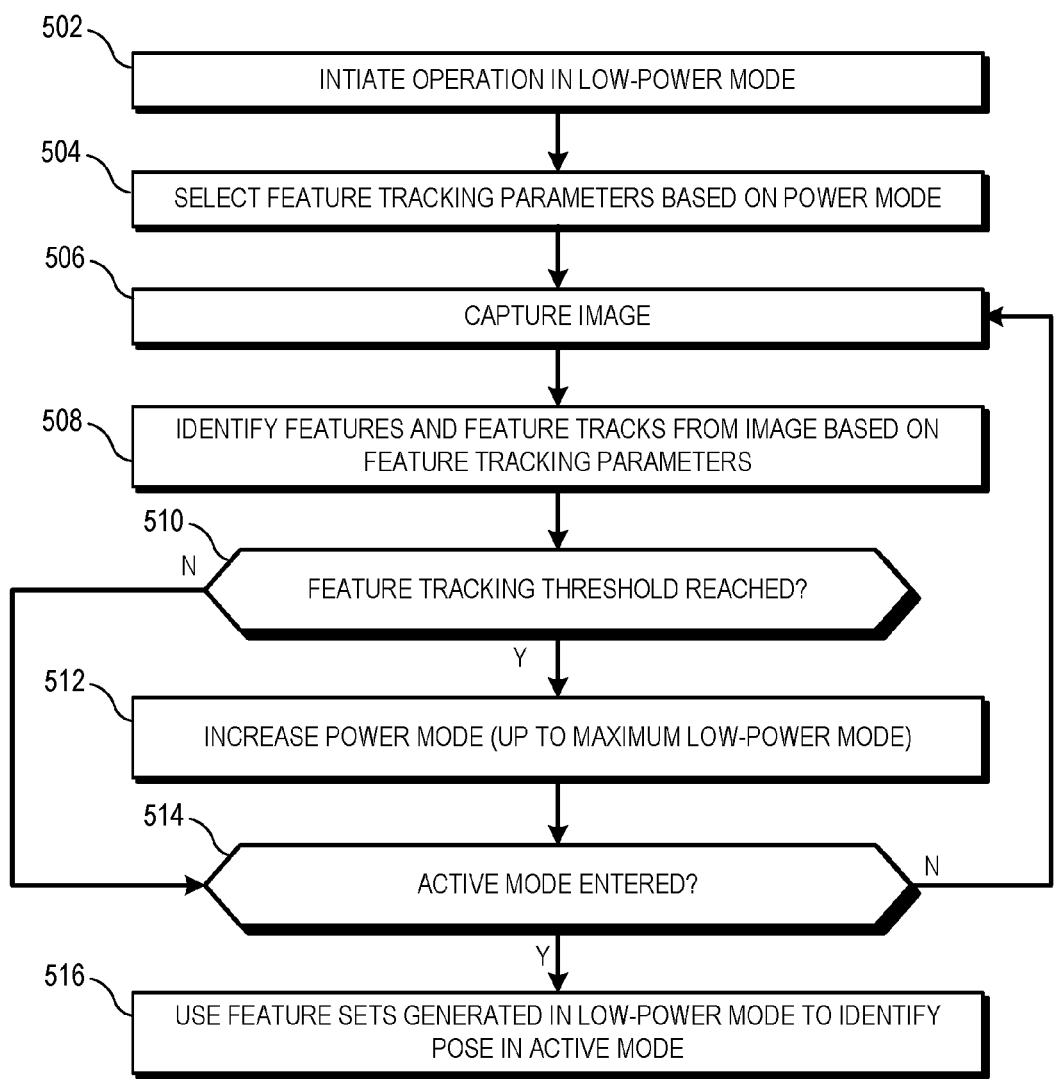

LOW-POWER MODE FEATURE IDENTIFICATION AT A HEAD MOUNTED DISPLAY

BACKGROUND

Field of the Disclosure

The present disclosure relates generally to virtual and augmented reality systems and more particularly to head mounted displays.

Description of the Related Art

To support virtual reality (VR) and augmented reality (AR) experiences, some head mounted displays (HMD) implement localization functionality, wherein the HMD identifies its pose (position and orientation) within a frame of reference based on the local environment of the HMD. The localization functionality can employ a variety of information to determine the HMD pose, including device motion information supplied by one or more motion sensors such as sensors incorporated in an inertial measurement unit (IMU), and information supplied by Global Positioning System (GPS) sensors. In addition, some HMDs augment the localization functionality based on feature tracking, wherein the HMD identifies features from images of the local environment captured by the HMD, and identifies or refines its identified pose based on comparison of the identified features to a database of known features and their corresponding positions. However, augmenting the localization functionality based on imagery can require a significant amount of time, resulting in delays in pose identification after a reset of the HMD. These delays in turn can result in a poor user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 4 is a block diagram illustrating an example of the HMD of FIG. 1 attaching a timestamp to imagery captured in a low-power mode of the HMD in accordance with at least one embodiment.

FIG. 5 is a flow diagram of a method of an HMD adjusting feature tracking parameters based on a power mode of the HMD in accordance with at least one embodiment.

DETAILED DESCRIPTION

FIGS. 1-5 illustrate techniques for adjusting feature tracking parameters at an HMD based on a power mode of the HMD. Examples of feature tracking parameters that can be adjusted include the number of features identified from captured images, the scale of features identified from captured images, the number of images employed for feature tracking, and the like. By adjusting its feature tracking parameters based on its power mode, the HMD can initiate the feature tracking process in low-power modes and thereby shorted the time for high-fidelity feature tracking when a user initiates a VR or AR experience at the HMD.

To illustrate via an example, as used herein the fidelity of feature tracking refers to the quality of feature identification at an HMD, including the accuracy with which the features are identified, the consistency with which features are identified across different captured images, and the accuracy with which the pose of the HMD device can be identified. In at least one embodiment, the fidelity of feature tracking at the HMD depends, at least in part, on two factors: 1) the amount of computational resources applied to feature tracking, and therefore the power consumed by the HMD; and 2) the length of time since feature tracking was initiated—that is, the fidelity of feature tracking at the HMD typically improves over time. Accordingly, high fidelity feature tracking can be achieved by permanently maintaining the HMD in a high-power, computation-intensive mode. However, maintaining the HMD in such a high-power state is not feasible for most practical HMD designs and form factors, which rely at least in part on battery power. Using the techniques described herein, the HMD can initiate relatively low-fidelity feature tracking when the HMD is in a low-power state, then increase the fidelity of feature tracking as the HMD is transitioned to higher-power states. The HMD thereby conserves power while increasing the length of time (and therefore the overall fidelity) of the feature tracking process, which in turn improves the user experience.

Figure 1:
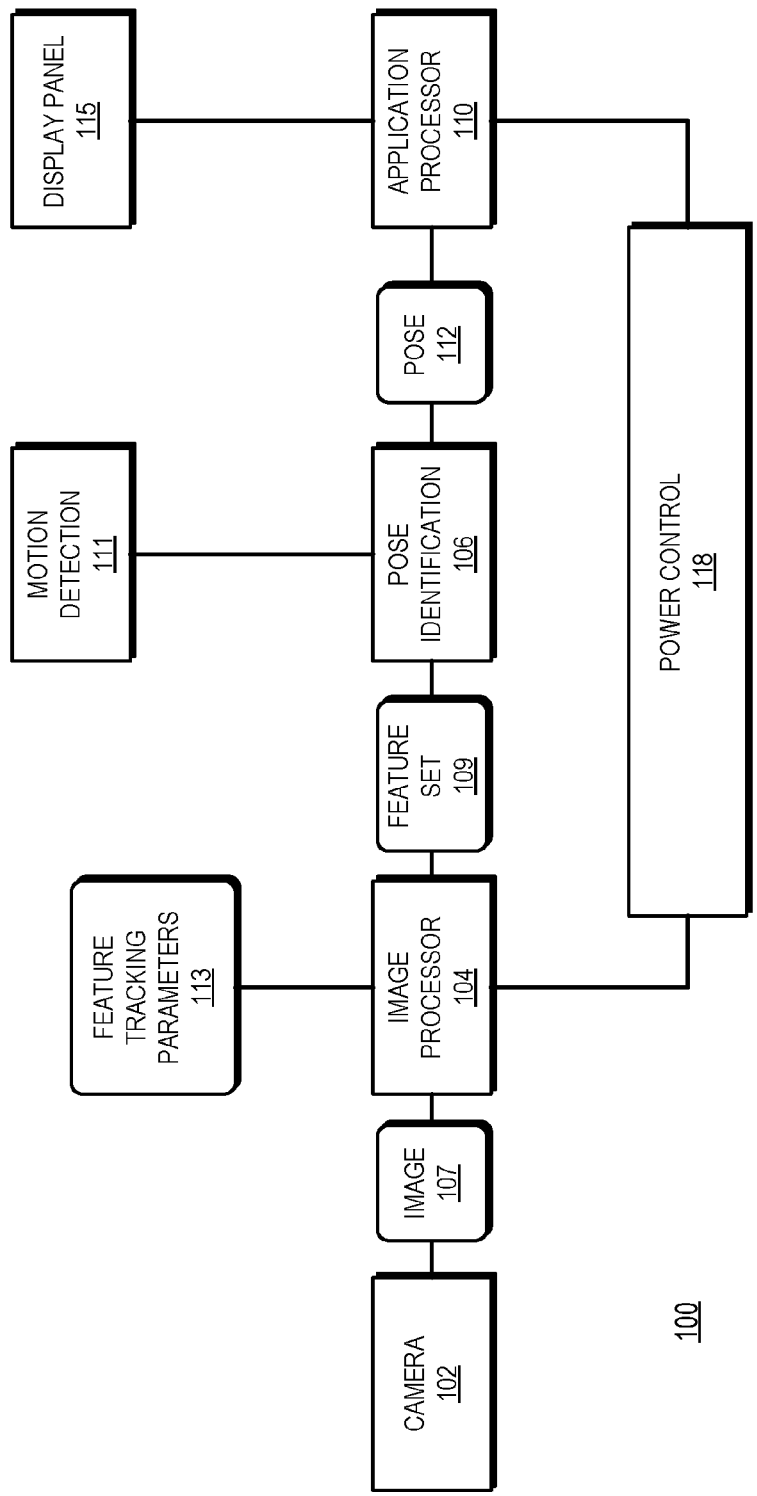
FIG. 1 is a block diagram of a head mounted display (HMD) that adjusts feature tracking parameters based on a power mode of the HMD in accordance with at least one embodiment.

FIG. 1 illustrates a block diagram of an HMD 100 that adjusts feature tracking parameters based on a power mode in accordance with at least one embodiment. In at least one embodiment the HMD device 100 is at least partially disposed into housing or other enclosure (not shown) having a form factor that supports attachment to a user's head, such as a goggles or glasses form factor. In particular, enclosure is formed such that, when it is attached to the user's head, the form factor facilitates display of imagery to the user's eyes. In other embodiments, the HMD device 100 may be a tablet, smartphone, or other electronic device that is not physically attached to the user's head via a mechanical attachment, but instead is held by the user in a relatively fixed position with respect to the user's eyes.

The HMD device 100 is generally configured to provide virtual reality (VR) or augmented reality (AR) content to the user. For purposes of description, the term VR content is used herein to refer either or both of VR content or AR content. In the example of FIG. 1, the HMD device 100 employs an application processor 110 that executes a VR application to generate VR content for display at a display panel 115. For example, the display panel 115 may be arranged at the HMD 100 to be in relatively close proximity to a user's eye, and the application processor generally configured to generate images of a virtual environment that are displayed to the user via the display panel 115.

As described further herein, to support for example a user experience wherein the user has an impression of moving around the virtual environment, the application processor is generally configured to generate the images of the virtual environment based on a pose 112. The pose 112 reflects a pose (position and orientation) of the HMD 100 within a frame of reference. For example, in response to a reset or other initialization event, the application processor 110 can identify the pose 112 as the origin of the frame of reference. As described further herein, the pose 112 changes over time as the user moves around the local environment. In response to these changes, the application processor 110 changes the pose of the HMD 100 in the frame of reference. In addition, based on the pose of the HMD 100 in the frame of reference, the application processor 110 makes corresponding changes in the images displayed at the display panel 115, thereby giving the user the impression that movements in the local environment of the HMD 100 are movements through the virtual environment.

To support generation of the pose 112, the HMD 100 includes a camera 102, an image processor 104, a pose identification module 106, and a motion detection module 111. The camera 102 is an image capturing device, such as a digital camera having a lens, shutter, and digital sensor to capture images (e.g., image 107). In at least one embodiment, the camera 102 represents multiple cameras, such as multiple digital cameras, one or more depth cameras, or a combination thereof.

The image processor 104 is a processor, such as a general purpose processor programmed to perform the operations described further herein, an application specific integrated circuit (ASIC) or programmable gate array configured to perform the operations described further herein, and the like. The image processor 104 is generally configured to identify features in captured images to generate for each captured image a corresponding feature set (e.g. feature set 109). To identify features in an image, the image processor 104 can employ one or more of a variety of feature identification techniques, including edge detection, pixel counting, color analysis, blob discovery, pattern recognition, and the like. In at least one embodiment, based on each identified feature, the image processor 104 generates a corresponding feature descriptor that identifies aspects of the feature, such as its shape, color, orientation, and the like, and stores the feature descriptor in the feature set 109. The image processor 104 can also identify feature tracks by identifying corresponding features between images and store the feature tracks at the feature set 109.

The motion detection module 111 is a module generally configured to provide information indicative of motion of the HMD 100. For example, in at least one embodiment the motion detection module is an inertial measurement unit including one or more accelerometers, gyroscopes, and other motion sensors and accompanying circuitry that together generate digital values in response to movement of the HMD 100.

The pose identification module 106 is a module generally configured to generate the pose 112 based on the motion information provided by the motion detection module 111 and the feature set 109. The pose identification module 106 may also employ additional pose information, such as geographical information generated by a GPS module (not shown). In at least one embodiment, the pose identification module 106 generates the pose 112 by identifying a provisional pose based on the differences indication by the motion information between the previously generated pose and the current pose of the HMD 100. The pose identification module 106 can then refine the provisional pose based on the feature set 109. For example, the pose identification module can compare the position of the features indicated by the feature descriptors of the feature set 109 to expected positions of the features as indicated by previous feature sets, and refine the provisional pose based on any differences. In at least one embodiment, the accuracy of the comparison and the corresponding feature positions, and therefore the accuracy with which the pose 112 reflects the actual pose of the HMD 100 increases as the fidelity of the feature set 109 increases.

The fidelity of the feature set 109 depends at least in part on one or more feature tracking parameters applied by the image processor 104, including the number of features identified from each image, the scale of the features identified in each image, the number of images used to identify feature tracks across images. Thus, to increase the fidelity of the feature set 109, the image processor 104 can adjust the feature tracking parameters, such as increasing the number of features identified in each image, reducing the scale of features identified in each image, and increasing the number of images used to identify feature tracks. However, each of these adjustments increases the number of computations to be performed by the image processor 104, and therefore the power consumed by the HMD 100. The power consumed by the image processor 104 can be minimized by suppressing the generation of feature sets until a user initiates active use of the HMD 100, but such suppression reduces the fidelity of the pose 112, as the pose tracking module must initially rely only on the motion information generated by the motion detection module 111 until the feature set 109 can be generated. Accordingly, to balance power consumption with the fidelity of the pose 112, the image processor 104 is configured to adjust the feature tracking parameters based at least on a power mode of the HMD 100.

To illustrate, the HMD 100 includes a power control module 118 that can identify the power mode of the HMD 100 and apply corresponding voltages and clock frequencies to at least the image processor 104 and the application processor 110. Further, in each power mode the power control module 118 can apply different voltages and clock frequencies to each of the image processor 104 and the application processor 110, such that each of the processors is operating under different voltage and clock frequency conditions.

For example, and for purposes of description herein, it is assumed that the HMD 100 can operate in at least three power modes, a first low-power mode (designated LP1), a second low-power mode (designated LP2), and an active mode (designated AM1). In the LP1 and LP2 modes, the application processor 110 is in a retention mode, whereby the power control module 118 provides sufficient voltage (and correspond clock signals) to the application processor 110 so that it can retain stored data and state information, but does not perform any calculations or execute any instructions. In the AM1 mode, the power control module 118 provides to the application processor 110 voltage and clock signals so that the application processor 110 can execute instructions.

With respect to the image processor 104, in the LP1 mode the power control module 118 provides sufficient voltage and clock signals so that the image processor 104 can execute instructions at a rate such that it generates feature sets under a corresponding set of feature tracking parameters, such that the resulting feature sets are of relatively low fidelity. In the LP2 mode, the power control module 118 provides sufficient voltage and clock signals so that the image processor 104 can execute instructions at a rate such that it generates feature sets under a corresponding set of feature tracking parameters, such that the resulting feature sets are of higher fidelity than in the LP1 mode. In the AM1 mode, the power control module 118 provides sufficient voltage and clock signals so that the image processor 104 can execute instructions at a rate such that it generates feature sets under a corresponding set of feature tracking parameters, such that the resulting feature sets are of relatively high fidelity, and are of higher fidelity that the feature sets generated in the LP2 mode.

Thus, the image processor 104 applies different feature tracking parameters in each of the different power modes, and therefore generates feature sets of different fidelity in each of the power modes. Further, the image processor 104 and pose identification module 106 can employ feature sets generated in one power mode as part of the feature tracking process in a different power mode. Thus, for example, a feature identified in the LP1 mode can continue to be tracked in the LP2 mode, and further in the AM1 mode. This allows the HMD 100 to begin feature tracking in a low-power mode, such as a sleep mode wherein a user is not actively interaction with the HMD 100. When the user begins active interaction with the HMD 100, such as by pressing a power button or placing the HMD 100 in the proper position for active use, the HMD 100 can transition to the active mode. Because feature tracking was begun in the low-power mode, in the active mode the pose identification module 106 can identify and refine the pose 112 relatively quickly, improving the user experience. It will be appreciated that the three power modes described above are an example only, and that the techniques described herein can be applied to HMDs having fewer or more power modes.

To select the feature tracking parameters for a given power mode, the image processor 104 can employ a stored set of feature tracking parameters 113. In at least one embodiment, the feature tracking parameters 113 include a table with each entry of the table corresponding to a different power mode. Each entry of the table stores the feature tracking parameters, such as a threshold number of features to be identified in an image, the smallest scale of features to be identified, the number of images to be employed to identify feature tracks, and the like. In at least one embodiment, the table is programmable or configurable, and can be tuned or adjusted by a manufacturer of the HMD 100 or by a user of the HMD 100.

In operation, the image processor 104 identifies the power mode of the HMD 100 based on the voltage and clock signals supplied by the power control module 118, or based on a separate power mode signal (not shown). The image processor 104 identifies the entry of the feature tracking parameters 113 corresponding to the power mode, and selects the feature tracking parameters stored at the corresponding entry. In response to receiving the image 107 from the camera 102, the image processor 104 identifies features and feature tracks as governed by the selected feature tracking parameters. In at least one embodiment, the feature tracking parameters represent threshold levels that are not to be exceeded by the image processor 104 in feature identification and feature tracking. For example, the selected feature tracking parameters can include a maximum number of features to be identified from the image 107. The image processor 104 identifies up to this maximum number, and generates a corresponding feature descriptor for the feature set 109, then stops identifying features for that image. For some images, the image processor 104 may not be able to identify the threshold number of features.

Similarly, with respect to the scale of features to be identified, the selected feature tracking parameters can indicate a minimum, or "smallest" scale of features to be identified, and the image processor 104 does not identify features smaller than the indicated scale. With respect to the number of images to be used to identify feature tracks, the selected feature tracking parameters can indicate a maximum number of images to be employed. The image processor 104 uses up to this maximum number of images to identify correspondences between features identified in the images, but in some scenarios may use fewer images, such as when the camera 102 has not yet supplied the maximum number of images.

In at least one embodiment, the power mode of the HMD 100 can change based on the features identified by the image processor 104. For example, in response to identifying a threshold number of features from an image while in the LP1 mode, or identifying a threshold number of features for a threshold number of successive images while in the LP1 mode, the image processor 104 can send a signal to the power control module 118. In response, the power control module 118 changes the power mode of the HMD 100 to the LP2 mode. This allows the image processor 104 to increase the fidelity of feature tracking when there are sufficient visual features in the images captured by the camera 102 to warrant the higher power mode.

In at least one embodiment, to continue to track features across the different power modes, the image processor 104 applies a timestamp to each feature descriptor in the feature set 109, indicating a time when the corresponding feature was identified. The allows the pose identification module 106 to properly sequence the feature descriptors when identifying correspondences between different feature sets, and therefore properly identify changes in the pose of the HMD 100.

Figure 2:
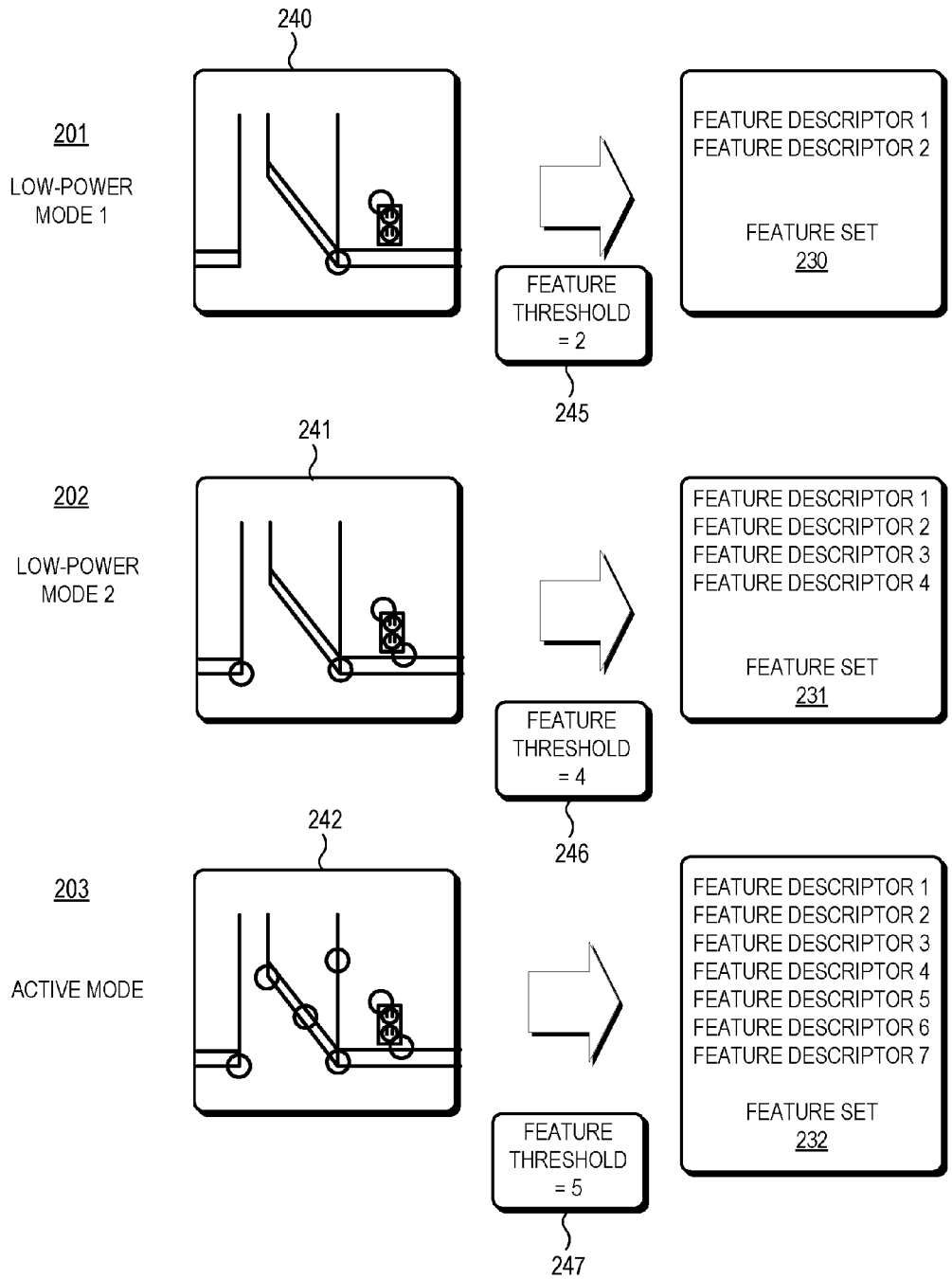
FIG. 2 is a block diagram illustrating an example of the HMD of FIG. 1 adjusting, based on a power mode of the HMD, a number of features identified in captured images in accordance with at least one embodiment.

FIG. 2 is a block diagram illustrating an example of the image processor 104 applying different feature tracking parameters, and in particular identifying a different threshold number of features from a captured image, in different power modes of the HMD 100. FIG. 2 illustrates three different instances in time, designated time 201, time 202, and time 203, each corresponding to a time when the HMD 100 is in a different power mode. In particular, for time 201 the HMD 100 is in the LP1 mode, for time 202 the HMD 100 is in the LP2 mode, and for time 203 the HMD 100 is in the AM1 mode.

For each mode, the image processor 104 employs different feature tracking parameters, designated feature tracking parameters 245, 246, and 247 respectively. Each of the feature tracking parameters 245-247 establishes a different maximum threshold number of features to be identified from the corresponding image. In particular, feature tracking parameters 245 establish a maximum threshold of two features, feature tracking parameters 246 establish a maximum threshold of four features, and feature tracking parameters 247 establish a maximum threshold of five features. In each power mode, the image processor 104 identifies up to the threshold number of features, as established by the corresponding feature tracking parameters, and stores a corresponding feature descriptor at the corresponding feature set.

To illustrate, during time 201 while the HMD 100 is in the LP1 mode, the camera 102 (FIG. 1) captures an image 240. In response, the image processor 104 identifies the power mode of the HMD 100 as the LP1 mode and selects the corresponding feature tracking parameters 245 from the feature tracking parameters 113 (FIG. 1). While the HMD 100 remains in the LP1 mode the image processor 104 identifies up to the threshold number of features (that is, up to two features) from the image 240 and stores corresponding feature descriptors for the identified features at a feature set 230.

During time 202, while the HMD 100 is in the LP1 mode, the camera 102 captures an image 241. In response, the image processor 104 identifies the power mode of the HMD 100 as the LP2 mode and selects the corresponding feature tracking parameters 246 from the feature tracking parameters 113. While the HMD 100 remains in the LP2 mode the image processor 104 identifies up to the threshold number of four features and stores corresponding feature descriptors for the identified features at a feature set 231.

During time 203, while the HMD 100 is in the LP1 mode, the camera 102 captures an image 242. In response, the image processor 104 identifies the power mode of the HMD 100 as the AM1 mode and selects the corresponding feature tracking parameters 247 from the feature tracking parameters 113. While the HMD 100 is in the AM1 mode the image processor 104 identifies up to the threshold number of five features and stores corresponding feature descriptors for the identified features at a feature set 232.

In at least one embodiment, while in the AM1 mode the pose identification module 106 identifies the pose 112 based on a combination of the feature sets 230-232. For example, in the illustrated example of FIG. 2, the feature sets 230-232 include feature descriptors for features that are common between the images 201-203 (that is, for features that appear in each of the images 201-203). The pose identification module 106 can identify these correspondences and employ them to better refine the pose 112, such as by increasing a confidence value associated with the corresponding features, by reducing an error value associated with the corresponding features, and the like. Thus, by initiating the identification of features in the low-power modes using relatively low-fidelity feature tracking parameters, the HMD 100 can conserve power while improving the feature tracking process.

Figure 3:
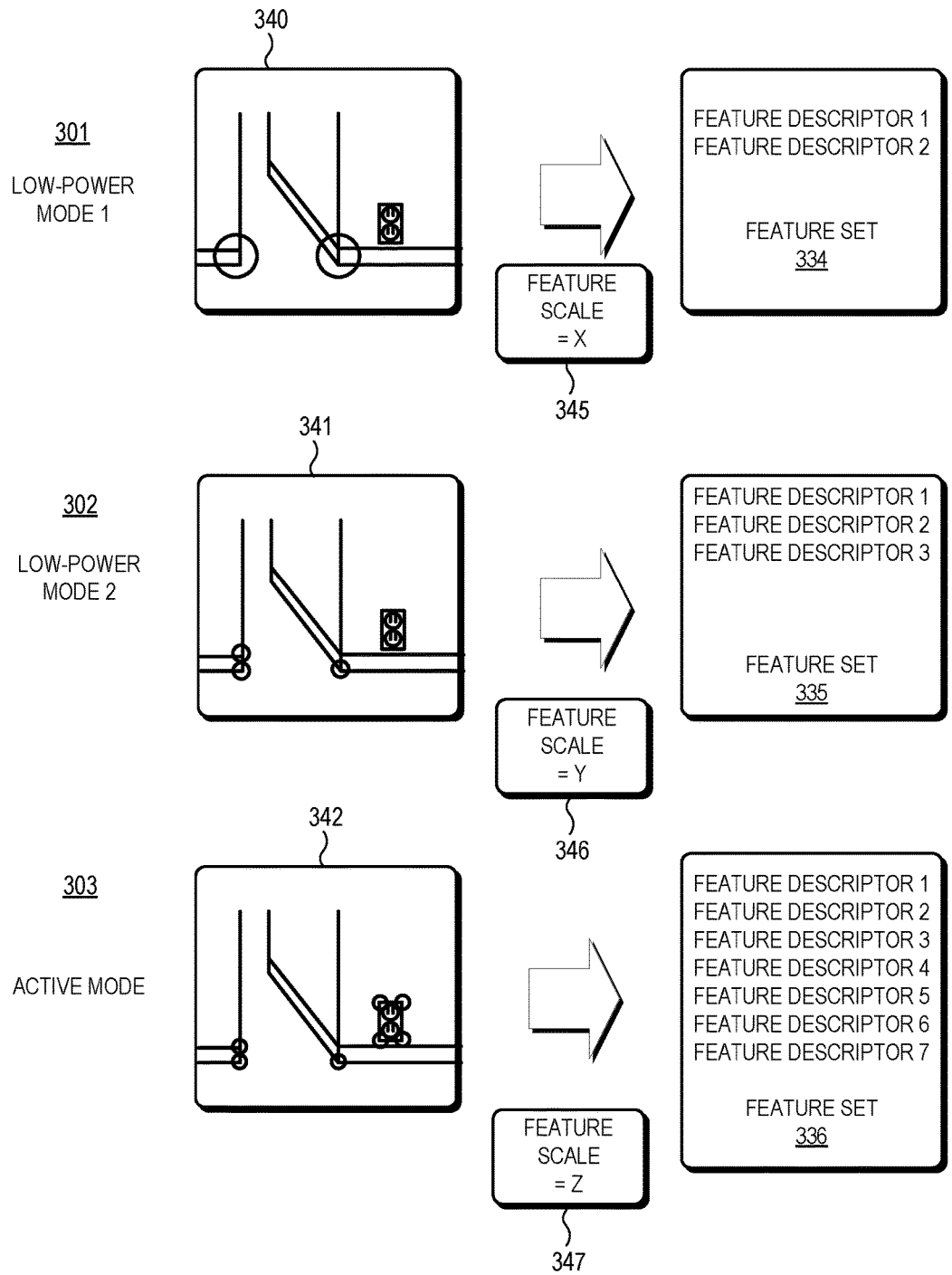
FIG. 3 is a block diagram illustrating an example of the HMD of FIG. 1 adjusting, based on a power mode of the HMD, a scale of features identified in captured images in accordance with at least one embodiment.

FIG. 3 is a block diagram illustrating an example of the image processor 104 applying different feature tracking parameters in different power modes of the HMD 100, and in particular applying a different scale factor to a captured image to identify features of the captured image. In at least one embodiment, the scale factor refers to a relative size of a window the image processor 104 applies to sections of the image. The image processor 104 then compares portions of the window to identify contrasts, and thereby identify edges or other features of the image. Thus, for purposes of description herein, the smaller the scale factor the smaller the size of the features that the image processor 104 can identify in an image and therefore the resolution of the resulting feature descriptors and feature tracks. Similar to FIG. 2, FIG. 3 illustrates three different instances in time, designated time 301, time 302, and time 303, each corresponding to a time when the HMD 100 is in a different power mode. In particular, for time 301 the HMD 100 is in the LP1 mode, for time 302 the HMD 100 is in the LP2 mode, and for time 303 the HMD 100 is in the AM1 mode.

For each mode, the image processor 104 employs different feature tracking parameters, designated feature tracking parameters 345, 346, and 347 respectively. Each of the feature tracking parameters 345-347 establishes a different scale factor for the features to be identified from the corresponding image. In particular, feature tracking parameters 245 establish a scale factor of X, feature tracking parameters 346 establish a scale factor of Y, and feature tracking parameters 347 establish a scale factor of Z, wherein X, Y, and Z are different values. In each power mode, the image processor 104 identifies features in the corresponding image based on the corresponding scale factor, and stores corresponding feature descriptors at the corresponding feature set.

To illustrate, during time 301 while the HMD 100 is in the LP1 mode, the camera 102 (FIG. 1) captures an image 340. In response, the image processor 104 identifies the power mode of the HMD 100 as the LP1 mode and selects the corresponding feature tracking parameters 345 from the feature tracking parameters 113 (FIG. 1). While the HMD 100 remains in the LP1 mode the image processor 104 identifies features from the image 340 based on the scale factor X and stores corresponding feature descriptors for the identified features at a feature set 330.

During time 302, while the HMD 100 is in the LP1 mode, the camera 102 captures an image 341. In response, the image processor 104 identifies the power mode of the HMD 100 as the LP2 mode and selects the corresponding feature tracking parameters 346 from the feature tracking parameters 113. While the HMD 100 remains in the LP2 mode the image processor 104 identifies features from the image 340 based on the scale factor Y and stores corresponding feature descriptors for the identified features at a feature set 331.

During time 303, while the HMD 100 is in the LP1 mode, the camera 102 captures an image 242. In response, the image processor 104 identifies the power mode of the HMD 100 as the AM1 mode and selects the corresponding feature tracking parameters 347 from the feature tracking parameters 113. While the HMD 100 is in the AM1 mode the image processor 104 identifies features from the image 340 based on the scale factor Z and stores corresponding feature descriptors for the identified features at a feature set 332.

FIGS. 2 and 3 illustrate examples of the image processor 104 selecting and applying individual feature tracking parameters based on the power mode of the HMD 100. In at least one other embodiment, the image processor 104 can select different combinations of feature tracking parameters based on the power mode of the HMD 100. For example, the feature tracking parameters for different power modes can include both a different maximum threshold number of features to be identified, a different scale factor to be applied to identifying features from the image, and a different number of images to be used to identify feature tracks among the images. Further, in at least one embodiment, the feature tracking parameters for each power mode can include different or additional feature tracking parameters to those described with respect to FIGS. 2 and 3, such as a resolution of the image being captured by the camera 102, the frequency with which images are captured, and the like.

FIG. 4 illustrates a block diagram of a feature descriptor 450 that can be generated by the image processor in each of the power modes of the HMD 100 in accordance with at least one embodiment. In the illustrated example, the feature descriptor 450 includes a descriptor field 451 that stores information about the feature associated with the descriptor, such as a feature type, feature size, feature shape, feature color, feature rotation or orientation in a frame of reference, feature position in the frame of reference, and the like, or a combination thereof. The feature descriptor 450 also includes a timestamp field 452 that stores a timestamp indicating one or more of the capture time of the image from which the feature descriptor 450 was generated, the time when the feature descriptor 450 was generated, and the like.

The timestamp can be employed by the image processor 104 to identify the position of the feature descriptor in a sequence of feature descriptors corresponding to the same feature and identified from different captured images. The image processor 104 can therefore properly identify feature tracks and other feature information that depends on the feature descriptors being properly synchronized in time. Further, the time sequence for the timestamps continues across changes in power modes of the HMD 100. That is, the timestamps are not reset in response to a change in power mode of the HMD 100, but instead the relative position of the timestamps in time is maintained by the image processor 104. This supports the image processor identifying feature tracks based on different feature descriptors generated by the image processor 104 during different power modes of the HMD 100.

FIG. 5 depicts a flow diagram of a method 500 of setting feature tracking parameters at an HMD based on a power mode of the HMD in accordance with at least one embodiment. For purposes of description, the method 500 is described with respect to an example implementation at the HMD 100 of FIG. 1. At block 502 the HMD 100 enters the LP1 mode in response to, for example, a user providing a specified input. At block 504, while in the LP1 mode the image processor 104 selects from the feature tracking parameters 113 the set of feature tracking parameters corresponding to the current power mode of the HMD 100.

At block 506 the camera 102 captures the image 107. At block 508 the image processor 104 employs the feature tracking parameters selected at block 504 to identify features and feature tracks from the captured image, and stores corresponding feature descriptors and feature tracking information at the feature set 109. At block 510, the image processor 104 identifies whether a specified feature tracking threshold has been reached, such as whether a threshold number of features have been identified from the captured image. If not, the method flow proceeds to block 514, described below. If the feature tracking threshold has been reached, the method flow moves to block 512 and the image processor 104 sends a signal to the power control module 118 to increase the power mode for the HMD 100. In at least one embodiment, the power control module 118 is configured to only increase the power mode based on feature tracking up to a specified low-power mode. Thus, for example, the power control module 118 will not place the HMD 100 into an active mode based only on the image processor 104 identifying a threshold number of features. The method flow proceeds to block 514.

At block 514, the HMD 100 identifies whether it has entered the active mode in response to, for example, a user initiating use of the HMD 100. If not, the method flow returns to block 506 and the camera 102 captures another image. If at block 514 the HMD 100 has entered the active mode, the image processor 104 and the pose identification module 106 can use the feature sets generated in the low-power modes to identify the pose of the HMD 100 while it is in the active mode. The HMD 100 is thus able to conserve power while improving feature tracking and pose identification.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:
1. A method comprising:
capturing a first image at a head mounted display (HMD) while the HMD is in a first low-power mode;
identifying a first set of features from the first image without identifying a pose of the HMD based on the first set of features while the HMD is in the first low-power mode, the first set of features including a first threshold number of features based on the first low power mode;
capturing a second image while the HMD is in an active mode; and while the HMD is in the active mode, identifying a second set of features from the second image including a second threshold number of features based on the active mode, and identifying the pose of the HMD based on the first set of features and the second set of features.

2. The method of claim 1, further comprising:
applying first timestamps to the first set of features while the HMD is in the first low-power mode;
applying second timestamps to the second set of features while the HMD is in the active mode; and
wherein identifying the pose of the HMD comprises synchronizing the first timestamps with the second timestamps.

3. The method of claim 1, further comprising:
in response to identifying the first threshold number of features from the first image while the HMD is in the first low-power mode, transitioning the HMD from the first low-power mode to a second low-power mode.

4. The method of claim 3, further comprising:
capturing a third image at the HMD while the HMD is in the second low-power mode;
identifying a third set of features from the third image while the HMD is in the second low-power mode, the third set of features including a third threshold number of features based on second low power mode; and
wherein identifying the pose of the HMD comprises identifying the pose of the HMD based on the first set of features and the third set of features.

5. The method of claim 4, wherein:
identifying the first set of features comprises identifying the first set of features based on a first scale factor indicative of a first size of features to be identified.

6. The method of claim 5, wherein:
identifying the second set of features comprises identifying the second set of features based on a second scale factor indicative of a second size of features to be identified, the second size different from the first size.

7. The method of claim 4, wherein:
identifying the first set of features comprises identifying the first set of features based on a first set of captured images including the first image, the first set of captured images including a first threshold number of images based on the first low-power mode.

8. The method of claim 7, wherein:
identifying the second set of features comprises identifying the second set of features based on a second set of captured images including the second image, the second set of captured images including a second threshold number of images based on the active mode, the second threshold number of images different from the first threshold number of images.

9. A method comprising:
capturing a first image at a head mounted display (HMD) while the HMD is in a first low-power mode;
identifying a first set of features from the first image without identifying a pose of the HMD based on the first set of features while the HMD is in the first low-power mode, the first set of features identified based on a first scale factor indicative of a first size of features to be identified, the first scale factor based on the first low power mode;
capturing a second image while the HMD is in an active mode; and
while the HMD is in an active mode, identifying a second set of features from the second image based on a second scale factor indicative of a second size of features to be identified, and identifying the pose of the HMD based on the first set of features and the second set of features.

10. The method of claim 9, further comprising:
transitioning the HMD from the first low-power mode to a second low-power mode;
capturing a third image while the HMD is in the second low-power mode;
identifying a third set of features from the third image while the HMD is in the second low-power mode, the third set of features identified based on a third scale factor indicative of a third size of features to be identified different from the first size of features to be identified, the third scale factor based on the second low-power mode; and
wherein identifying the pose of the HMD comprises identifying the pose of the HMD based on the first set of features and the third set of features.

11. A head mounted display (HMD), comprising:
a camera to capture a first image while the HMD is in a first low-power mode and to capture a second image while the HMD is in an active mode;
an image processor to identify a first set of features from the first image without identifying a pose of the HMD based on the first set of features while the HMD is in a first low-power mode, the first set of features including a first threshold number of features based on the first low power mode, and to identify a second set of features from the second image while the HMD is in the active mode, the second set of features including a second threshold number of features based on the active mode; and
a pose identification module to identify the pose of the HMD based on the first set of features and the second set of features while the HMD is in the active mode.

12. The HMD of claim 11, wherein the image processor is to:
apply first timestamps to the first set of features while the HMD is in the first low-power mode;
apply second timestamps to the second set of features while the HMD is in the active mode; and
wherein the pose identification module is to identify the pose of the HMD by synchronizing the first timestamps with the second timestamps.

13. The HMD of claim 11, further comprising:
a power control module to transition the HMD from the first low-power mode to a second low-power mode in response to identifying the first threshold number of features from the first image while the HMD is in the first low-power mode.

14. The HMD of claim 13, wherein:
the camera is to capture a third image while the HMD is in the second low-power mode;
the image processor is to identify a third set of features from the third image while the HMD is in the second low-power mode, the third set of features including a third threshold number of features based on second low power mode; and
wherein the pose identification module is to identify the pose of the HMD comprises based on the first set of features and the third set of features.

15. The HMD of claim 14, wherein:
the image processor is to identify the first set of features based on a first scale threshold indicative of a first size of features to be identified.

16. The HMD of claim 15, wherein:
the image processor is to identify the second set of features based on a second scale threshold indicative of a second size of features to be identified, the second size different from the first size.

17. The HMD of claim 14, wherein:
the image processor is to identify the first set of features based on a first set of captured images including the first image, the first set of captured images including a first threshold number of images based on the first low-power mode.

\* \* \* \* \*